United States Patent
Braun et al.

(12) 
(10) Patent No.: US 7,026,044 B2
(45) Date of Patent: Apr. 11, 2006

(54) ELASTIC INORGANIC FOAM

(75) Inventors: Frank Braun, Ludwigshafen (DE); Horst Baumgartl, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/486,394

(22) PCT Filed: Aug. 10, 2002

(86) PCT No.: PCT/EP02/08989

§ 371 (c)(1),
(2), (4) Date: Feb. 11, 2004

(87) PCT Pub. No.: WO03/018476

PCT Pub. Date: Mar. 6, 2003

(65) Prior Publication Data

US 2004/0231564 A1    Nov. 25, 2004

(30) Foreign Application Priority Data

Aug. 25, 2001   (DE) ................ 101 41 777

(51) Int. Cl.
B32B 3/26      (2006.01)
B05D 3/02     (2006.01)
C04B 12/04    (2006.01)
B29C 39/00    (2006.01)

(52) U.S. Cl. ............... 428/304.4; 428/307.3; 428/312.6; 428/218; 428/446; 428/697; 428/701; 106/601; 427/244; 427/243; 427/373; 264/415; 264/416; 264/417; 264/414

(58) Field of Classification Search ............ 428/304.4, 428/307.3, 312.6, 218, 446, 697, 701; 106/601; 427/244, 243, 373; 264/415–417, 414
See application file for complete search history.

(56) References Cited

U.S. PATENT DOCUMENTS

| 3,737,332 | A |   | 6/1973  | Sennett et al. |
| 3,850,650 | A |   | 11/1974 | Van Bonin et al. |
| 3,864,137 | A |   | 2/1975  | Van Bonin et al. |
| 3,944,425 | A | * | 3/1976  | Magder ................. 501/84 |
| 4,133,691 | A |   | 1/1979  | Kindt et al. |
| 4,533,490 | A |   | 8/1985  | Kluth et al. |
| 5,298,068 | A |   | 3/1994  | Giesemann |
| 6,085,839 | A |   | 7/2000  | Wyant et al. |

FOREIGN PATENT DOCUMENTS

| DE | A 21 65 912 | 7/1973 |
| DE | A 32 44 523 | 6/1984 |
| DE | A 36 17 129 | 11/1987 |
| EP | A 407 921   | 11/1992 |
| WO | WO 89/05285 | 6/1989 |

OTHER PUBLICATIONS

Abstract of JP A05-221743 (Date of Pat.Aug. 31, 1993), Database WPI, Week 199339, Derwent Publications Ltd., London, GB; AN 1993-309026 XP002231322 & JP 05 221743 A (Riken Corp).
Abstract of JP A 54 131619, Chemical Abstracts, vol. 92, No. 14, (Apr. 7, 1980), Columbus, Ohio, USA; abstract No. 115276m, p. 278.

* cited by examiner

*Primary Examiner*—Ling X Xu
(74) *Attorney, Agent, or Firm*—Novak Druce DeLuca & Quigg, LLP

(57) ABSTRACT

An open-celled, inorganic foam based on an aluminosilicate and having a density of less than 25 g/l can be prepared by reacting and foaming an alkali metal silicate solution with an alkali metal aluminate solution in the presence of a volatile blowing agent and an emulsifier.

9 Claims, No Drawings

ELASTIC INORGANIC FOAM

This application is a 371 of PCT/EP02/08989 filed on Aug. 10, 2002.

The present invention relates to an elastic inorganic foam based on an aluminosilicate and to a process for producing it.

BACKGROUND OF THE INVENTION

Organic foams based on polystyrene, polyolefin and polyurethane are very useful for thermal and acoustic insulation, but they are comparatively readily flammable and therefore unsuitable for many applications. BASOTECT, a foam based on melamine-formaldehyde resins and produced by BASF AG, has a high elasticity as a result of its open cells and its low density, which is of great advantage in handling and processing. Although elastic melamine-formaldehyde foams are not readily flammable, they are still combustible and thus do not meet the conditions of fire protection class A in accordance with DIN 4102. These conditions are naturally met by foams having an inorganic basis. However, the inorganic foams known hitherto all have a relatively high density and are thus not elastic. In addition, most of them are in-situ foams which are produced by, for example, injecting the components directly into hollow spaces on the building site and foaming and curing them there.

DE-A 21 65 912 describes a process for producing foams in which aqueous silicate solutions together with acid-releasing hardeners are foamed with the aid of volatile organic blowing agents and cured. The density of the open-celled foams varies from 20 to 900 g/l. The lowest density reported in the examples is 40 g/l. Elastic foams are not mentioned.

DE-A 32 44 523 describes the production of in-situ foams produced by mixing an alkali metal silicate solution with a hardener solution and a liquefied blowing gas under superatmospheric pressure. Hardeners used are acid-releasing carboxylic esters; the lowest density reported in the examples is 40 g/l. Both documents describe pure silicate foams which are not sufficiently moisture-resistant for practical use.

DE-A 36 17 129 likewise describes the production of in-situ foams. In the process described here, an aqueous silicate solution is foamed in the presence of a hardener by means of a gas which has been generated in a chemical reaction from a gas generation system, e.g. hydrogen peroxide. Hardeners used include, inter alia, alkali metal aluminate. The density of the in-situ foam varies from 30 to 1000 g/l.

According to WO 89/05285, a ceramic composition is produced by foaming an aqueous mixture of alkali metal silicate, alkali metal aluminate, a refractory ceramic material and aluminum powder, which generates hydrogen gas to act as blowing agent. The density of the ceramic composition is in the region of 500 g/l.

Finally, according to EP-A 407 921, a mixture of alkali metal water glass and a filler, e.g. aluminum oxide, is foamed by means of a chemical blowing agent, preferably azodicarbonamide, to give an open-celled, cured foam body having a density in the range from 50 to 500.

BRIEF SUMMARY OF THE INVENTION

It is an object of the present invention to provide an inorganic foam which is not only noncombustible and moisture-resistant but also has a good elasticity and can thus be readily handled and processed. It should be largely open-celled and thus also suitable for acoustic insulation. In contrast to in-situ foams, it should have a defined three-dimensional shape, e.g. be in the form of blocks, sheets or regular particles.

We have found that this object is achieved by an open-celled, aluminosilicate-based inorganic foam having an $SiO_2:Al_2O_3$ molar ratio of from 20:1 to 1:1 and a density of less than 25 g/l. It is assumed that the elasticity of the foams of the present invention is due to open-celled foams which have a low density consisting essentially of thin cell walls which are relatively easy to deform. The $SiO_2:Al_2O_3$ molar ratio is preferably from 10:1 to 2:1; the density of the foam is preferably below 20 g/l, in particular from 8 to 18 g/l. The proportion of open cells, measured in accordance with DIN ISO 4590, is preferably greater than 50%, in particular greater than 80%.

DETAILED DESCRIPTION OF THE INVENTION

In a preferred embodiment, the foam of the present invention is produced by reacting an aqueous solution of an alkali metal silicate with an aqueous solution of an alkali metal aluminate in a molar ratio of from 20:1 to 1:1 in the presence of a volatile organic blowing agent and a surfactant and foaming it during this reaction.

The alkali metal silicates have the formula $Me_2O \cdot (SiO_2)_{2-4}$, where Me is an alkali metal, preferably sodium. Preference is given to water glass solutions having a solids content of from 20 to 70% by weight, in particular from 30 to 60% by weight.

The alkali metal aluminates have the formula $Me[Al(OH)_4]$; the preferred alkali metal is once again sodium. Here too, solutions having a concentration of from 20 to 70% by weight, in particular from 30 to 60% by weight, are preferred.

Preferred volatile blowing agents are organic compounds such as hydrocarbons, halogenated hydrocarbons, alcohols, ethers, ketones and esters. However, it is also possible to use inert gases such as $N_2$ or air, acidic gases such as $CO_2$ and $SO_2$ and also basic gases such as $NH_3$. When using a reactive gas, combining it with one of the abovementioned organic compounds is advantageous. Particular preference is given to $C_4$–$C_6$-hydrocarbons, in particular pentanes. The blowing agents are preferably used in amounts of from 1 to 40% by weight, in particular from 5 to 15% by weight, based on the solids.

To emulsify the blowing agent and to stabilize the foam, it is necessary to add an emulsifier or an emulsifier mixture. As emulsifier, it is possible to use anionic, cationic and nonionic surfactants.

Suitable anionic surfactants are diphenylene oxide sulfonates, alkanesulfonates and alkylbenzenesulfonates, alkylnaphthalenesulfonates, olefin sulfonates, alkyl ether sulfonates, alkyl sulfates, alkyl ether sulfates, alpha-sulfo fatty acid esters, acylaminoalkanesulfonates, acylisethionates, alkyl ether carboxylates, N-acylsarcosinates, alkyl phosphates and alkyl ether phosphates. As nonionic surfactants, it is possible to use alkylphenol polyglycol ethers, fatty alcohol polyglycol ethers, fatty acid polyglycol ethers, fatty acid alkanolamides, EO/PO block copolymers, amine oxides, glyceryl esters of fatty acids, sorbitan esters and alkylpolyglucosides. Cationic surfactants used are alkyltri-ammonium salts, alkylbenzyldimethylammonium salts and alkylpyridinium salts. The emulsifiers are preferably added in amounts of from 0.1 to 5% by weight, based on the resin.

The mixture to be foamed may further comprise customary additives such as pigments and fillers.

The process is advantageously carried out in a plurality of steps which follow one another directly:
a) Alkali metal silicate solution, blowing agent and emulsifier are firstly mixed.
b) The alkali metal aluminate solution is added to this mixture. The temperature during the addition should be below 50° C., preferably below 30° C. and in particular in the range from 10 to 25° C. At these temperatures, the reaction of the silicate with the aluminate commences but a homogeneous mixture can still be produced.
c) The mixture is subsequently heated to above 50° C., preferably to 80–100° C. This results in vaporization of the blowing agent and the foaming process begins. At the same time, the reaction of the silicate with the aluminate continues, finally forming a solid foam.
d) Finally, the moist foam is heated to above 100° C., resulting in evaporation of the water.

The heating in steps c) and d) can be carried out by customary methods, e.g. in an oven, by means of hot air or using microwaves. The microwave method is preferred because it makes particularly homogeneous and rapid heating possible. Steps c) and d) can also be carried out as one process step.

In another embodiment, the mixture obtained after step b) is placed under a lower pressure. This results in expansion of the blowing agent and a solid foam is likewise formed. This is then treated as in step d). The pressure reduction can also encompass depressurizing the mixture under a pressure P1 through a nozzle to a pressure P2<P1, where P1>1 bar. In these embodiments, heating to induce foaming is not absolutely necessary.

The process described produces foam blocks or sheets which can be cut to any desired shape.

The foam of the present invention can be used in a variety of ways for thermal and acoustic insulation in the building and construction industry and in automobile construction, for example for thermal insulation in construction of houses or as acoustic insulation in the engine compartment.

What is claimed is:

1. An aluminosilicate-based inorganic foam having an $SiO_2:Al_2O_3$ molar ratio of from 20:1 to 1:1, a density of less than 25 g/l and a proportion of open cells in accordance with DIN ISO 4590 of more than 50%.

2. A process for producing an inorganic foam as claimed in claim 1, which comprises reacting an aqueous solution of an alkali metal silicate with an aqueous solution of an alkali metal aluminate in a molar ratio of silicate to aluminate of from 20:1 to 1:1 in the presence of a volatile organic compound as blowing agent and an emulsifier and foaming it during the reaction.

3. A process as claimed in claim 2, wherein the blowing agent is a $C_4$–$C_6$-hydrocarbon.

4. A process as claimed in claim 2 which comprises the following steps:
a) alkali metal silicate, blowing agent and emulsifier are mixed,
b) the alkali metal aluminate is added to this mixture at below 50° C. and mixed in,
c) the mixture is heated to 50–100° C.,
d) the mixture is heated to above 100° C., resulting in evaporation of the water.

5. A process as claimed in claim 4, wherein steps c) and d) are carried out as a single process step.

6. A process as claimed in claim 4, wherein heating is carried out by means of microwaves.

7. A process as claimed in claim 2 which comprises the following steps:
a) alkali metal silicate, blowing agent and emulsifier are mixed,
b) the alkali metal aluminate is added to this mixture at below 50° C. and mixed in,
c) the mixture is placed under subatmospheric pressure,
d) the mixture is heated to above 50° C., resulting in evaporation of the water.

8. A process as claimed in claim 7, wherein the pressure reduction and heating are carried out in one step.

9. A process as claimed in claim 2 which comprises the following steps:
a) alkali metal silicate, blowing agent and emulsifier are mixed,
b) the alkali-metal aluminate is added to this mixture at below 50° C. and mixed in,
c) the mixture is expressed through a nozzle and depressurized to a lower pressure,
d) the mixture is heated to above 50° C., resuting in evaporation of the water.

* * * * *